United States Patent
Lee et al.

(10) Patent No.: US 10,479,889 B2
(45) Date of Patent: Nov. 19, 2019

(54) THERMOPLASTIC RESIN COMPOSITION, MOLDED ARTICLE MADE THEREFROM, AND METHOD OF PREPARING THE COMPOSITION

(71) Applicant: Samsung Electronics Co., Ltd., Suwon-si, Gyeonggi-do (KR)

(72) Inventors: Kyunghae Lee, Incheon (KR); Seungjoon Hwang, Seoul (KR); Namsoo Park, Suwon-si (KR); Mooho Lee, Suwon-si (KR); Jun Chwae, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 433 days.

(21) Appl. No.: 14/848,057

(22) Filed: Sep. 8, 2015

(65) Prior Publication Data

US 2016/0185954 A1    Jun. 30, 2016

(30) Foreign Application Priority Data

Dec. 30, 2014    (KR) .................. 10-2014-0194324

(51) Int. Cl.
*C08L 67/04* (2006.01)
*C08K 5/00* (2006.01)
*C08L 23/08* (2006.01)

(52) U.S. Cl.
CPC ............ *C08L 67/04* (2013.01); *C08K 5/0016* (2013.01); *C08K 5/0083* (2013.01); *C08L 23/0846* (2013.01); *C08L 23/0853* (2013.01)

(58) Field of Classification Search
CPC .. C08L 67/04; C08L 2205/24; C08L 2205/03; C08L 2205/025; C08K 5/0016; C08K 5/0083; C08J 2431/04; C08J 5/00
USPC ................ 524/139, 161, 451, 502
See application file for complete search history.

(56) References Cited

U.S. PATENT DOCUMENTS

| | | | | |
|---|---|---|---|---|
| 8,604,123 B1 * | 12/2013 | Weismann | ............... | C08L 67/04 428/220 |
| 2004/0242803 A1 * | 12/2004 | Ohme | ..................... | C08L 59/00 525/400 |
| 2006/0147695 A1 * | 7/2006 | Serizawa | ................. | C08J 5/045 428/297.4 |
| 2014/0235777 A1 | 8/2014 | Noordegraaf et al. | | |

FOREIGN PATENT DOCUMENTS

| | | |
|---|---|---|
| JP | 1997151310 A | 6/1997 |
| JP | 3789217 B2 | 4/1999 |
| JP | 2007002128 A | 1/2007 |
| JP | 2007-63435 * | 3/2007 |
| JP | 2007-217513 * | 8/2007 |
| JP | 2007217513 A | 8/2007 |
| JP | 2008038142 A | 2/2008 |
| KR | 2010-0016042 A | 2/2010 |

OTHER PUBLICATIONS

Machine translation of JP 2007 63435 (Year: 2007).*
Machine translation of JP 2007-217513 (Year: 2007).*

* cited by examiner

*Primary Examiner* — Doris L Lee
(74) *Attorney, Agent, or Firm* — Leydig, Voit & Mayer, Ltd.

(57) ABSTRACT

A thermoplastic resin composition including a polylactic acid, a thermoplastic polymer having a lower glass transition temperature than the polylactic acid, a nucleating agent, and a reactive plasticizer, a molded article made therefrom, and a method of preparing the thermoplastic resin composition.

17 Claims, 1 Drawing Sheet

THERMOPLASTIC RESIN COMPOSITION, MOLDED ARTICLE MADE THEREFROM, AND METHOD OF PREPARING THE COMPOSITION

RELATED APPLICATION

This application claims the benefit of Korean Patent Application No. 10-2014-0194324, filed on Dec. 30, 2014, in the Korean Intellectual Property Office, the entire disclosure of which is hereby incorporated by reference.

BACKGROUND

1. Field

The present disclosure relates to thermoplastic resin compositions, molded articles made from the thermoplastic resin compositions, and methods of preparing the thermoplastic resin compositions.

2. Description of the Related Art

Interest in biodegradable resins, such as aliphatic polyesters, has increased in view of environmental protection. A polylactic acid (or polylactide) among the biodegradable resins has a high melting point of about 160° C. to about 170° C. and its transparency is excellent. Additionally, lactic acid, as a raw material of polylactic acid, may be obtained from renewable resources such as plants. Furthermore, since decomposition products of the polylactic acid are lactic acid, carbon dioxide, and water, which are harmless to the human body, polylactic acid may be used for various applications such as medical supplies.

The polylactic acid has poor impact resistance (i.e., impact resistance as measured by Izod impact testing) and heat resistance in comparison to a typical resin such as high impact polystyrene (HIPS) and acrylonitrile-butadiene-styrene (ABS). Thus, there is a need to improve the impact resistance and heat resistance of the polylactic acid. Various additives can be used to improve the impact resistance and heat resistance of the polylactic acid.

Typical resins, such as HIPS and ABS, may be molded in about 1 minute at room temperature. In contrast, in order to obtain a polylactic acid having improved impact resistance and heat resistance, a molding temperature of about 100° C. or more and a molding time of about 10 minutes or more are required. When the molding temperature and the molding time are reduced using conventional molding processes to make molded articles of polylactic acid, productivity may be improved, but may result in a molded article of polylactic acid having poor physical properties may be obtained.

Therefore, there is a need to develop a polylactic acid which may simultaneously provide improved heat resistance and impact resistance even under severe molding conditions.

SUMMARY

Provided is a thermoplastic resin composition comprising: a polylactic acid; a thermoplastic polymer having a lower glass transition temperature than the polylactic acid; a nucleating agent; and a reactive plasticizer.

Provided is a molded article comprising the thermoplastic resin composition. Provided is a method of preparing a thermoplastic resin composition, the method comprising: mixing a polylactic acid, a thermoplastic polymer having a lower glass transition temperature than the polylactic acid, a nucleating agent, and a reactive plasticizer. The method can be used to make a molded article by molding the mixture into a desired shape, wherein the molding comprises heating the mixture at a molding temperature of about 50° C. or more and cooling the mixture for about 150 seconds or less.

Related compositions and methods also are provided.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the FIGURES, to explain aspects. Expressions such as "at least one of," when preceding a list of elements, modify the entire list of elements and do not modify the individual elements of the list.

Hereinafter, a thermoplastic resin composition according to exemplary embodiments, a molded article made from the thermoplastic resin composition, and a method of preparing a thermoplastic resin composition will be described in more detail.

It will be understood that the terms "comprises," "comprise," "include," "includes," "including" and/or "comprising" as used herein specify the presence of stated elements or components without any specific limitations, but do not preclude the presence or addition of one or more other elements or components.

As used herein, the expression "lactide" includes L-lactide formed of L-lactic acid, D-lactide formed of D-lactic acid, and meso-lactide formed of L-lactic acid and D-lactic acid.

As used herein, the expression "polylactic acid" ("PLA") refers to all polymers including a repeating unit that is formed by ring-opening polymerization of a lactide monomer or direct polymerization of a lactic acid monomer. The polymer includes a homopolymer or a copolymer, and is not limited to specific examples in which the polymer is present. For example, the polymer includes various examples such as a crude or purified polymer after the completion of the ring-opening polymerization or the direct polymerization, a polymer included in a liquid or solid resin composition before product molding, or a polymer included in a plastic, film, or textile after the completion of the product molding.

As used herein, the expression "poly-L-lactic acid (PLLA)" refers to a polymer including a repeating unit that is formed by ring-opening polymerization or direct polymerization of an L-lactide monomer.

As used herein, the expression "poly-D-lactic acid (PDLA)" refers to a polymer including a repeating unit that is formed by ring-opening polymerization or direct polymerization of a D-lactide monomer.

As used herein, the expression "nucleating agent" refers to a material that acts as a nucleus for crystal formation in a thermoplastic resin composition.

Plasticizers are additives that increase plasticity or fluidity of a material to which they are added. As used herein, the expression "reactive plasticizer" refers to a plasticizer which includes a functional group reactive with a molecule or compound (e.g., polymer) with which it is combined. The reactive functional group may form a chemical bond by reacting with other components in a thermoplastic resin.

As used herein, the expression "thermoplastic resin" refers to a resin in which flexibility increases as the temperature increases.

A thermoplastic resin composition according to an embodiment of the present disclosure includes a polylactic acid; a thermoplastic polymer having a lower glass transition temperature than the polylactic acid; a nucleating agent; and a reactive plasticizer.

The fluidity of the thermoplastic resin composition may be increased and the chain folding energy of the thermoplastic resin composition may be decreased by including a reactive plasticizer. Thus, a crystallization rate of the thermoplastic resin composition may be increased during molding. Because a reactive functional group of the reactive plasticizer can be reacted (i.e., chemically bonded) with the polylactic acid to form a chemical bond, bleeding of the plasticizer may be suppressed and impact resistance of the thermoplastic resin composition may be improved. Further, since the thermoplastic resin composition may include the nucleating agent, the crystallization rate of the thermoplastic resin composition may be increased during molding and mechanical properties may also be improved. The impact resistance may be improved by including the thermoplastic polymer having a lower glass transition temperature than the polylactic acid. The thermoplastic having a lower glass transition temperature than the polylactic acid may improve the impact resistance by including a structural unit based on a monomer that interacts (e.g., chemically bonds) with the polylactic acid. The crystallization rate of the thermoplastic resin composition may be significantly increased and excellent impact resistance and heat resistance may be provided even under short molding times by simultaneously using the nucleating agent and the reactive plasticizer in the thermoplastic resin composition. As a result, the productivity of making thermoplastic resin compositions comprising a PLA may be significantly improved compared, for instance, to a comparative resin as set forth in the Examples.

A glass transition temperature ($T_g$) of the polylactic acid in the thermoplastic resin composition may be about 50° C. or more. For example, a $T_g$ of PLLA may be in a range of about 60° C. to about 65° C. A glass transition temperature of the thermoplastic polymer having a lower glass transition temperature than the polylactic acid may be about 40° C. or less. For example, the glass transition temperature of the thermoplastic polymer having a lower glass transition temperature than the polylactic acid may be about 30° C. or less. For example, the glass transition temperature of the thermoplastic polymer having a lower glass transition temperature than the polylactic acid may be about 10° C. or less. For example, the glass transition temperature of the thermoplastic polymer having a lower glass transition temperature than the polylactic acid may be about 0° C. or less. Since the thermoplastic resin composition may easily absorb an external impact by including the thermoplastic polymer having a lower glass transition temperature than the polylactic acid, the impact resistance of the thermoplastic resin composition may be improved compared, for instance, to a comparative resin as set forth in the Examples.

In the thermoplastic resin composition, the thermoplastic polymer having a lower glass transition temperature than the polylactic acid may be an olefin-based thermoplastic polymer. The olefin-based thermoplastic polymer refers to a polymer including a repeating unit comprising an olefin-based monomer (e.g., an olefin-based monomer). The olefin-based thermoplastic polymer may be a copolymer of an olefin-based monomer and another (i.e., "the other") monomer. The olefin-based monomer in the olefin-based thermoplastic polymer may be, e.g., ethylene or propylene. Other suitable monomers in the olefin-based thermoplastic polymer may be, e.g., vinyl acetate, acrylate, or acrylic acid. However, the other monomer is not necessarily limited thereto and any monomer may be used as long as it is used as a monomer capable of having molecular interaction with a polylactic acid in the art.

The thermoplastic polymer having a lower glass transition temperature than the polylactic acid may be selected from the group consisting of an ethylene/vinyl acetate copolymer; an ethylene/(meth)acrylate ester copolymer; a polyolefin-based resin which includes at least one functional group selected from the group consisting of an acid anhydride group, a carboxyl group, an alkoxysilyl group, a silanol group, a silyl ether group, and a hydroxyl group; and an acryl-based resin which includes at least one functional group selected from the group consisting of an acid anhydride group, a carboxyl group, an alkoxysilyl group, a silanol group, a silyl ether group, a hydroxyl group, and an epoxy group; or combinations thereof.

The thermoplastic polymer having a lower glass transition temperature than the polylactic acid may be an ethylene vinyl acetate copolymer which includes about 60 wt % to about 90 wt % of a structural unit derived from ethylene (e.g., ethylene-based structural units) and about 10 wt % to about 40 wt % of a structural unit derived from vinyl acetate (e.g., vinyl-acetate based structural units). For example, the ethylene vinyl acetate copolymer may include about 60 wt % to about 85 wt % of the structural units derived from ethylene (e.g., ethylene-based structural units) and about 15 wt % to about 40 wt % of the structural units derived from vinyl acetate (e.g., vinyl-acetate based structural units). For example, the ethylene vinyl acetate copolymer may include about 60 wt % to about 80 wt % of the structural unit derived from ethylene and about 20 wt % to about 40 wt % of the structural unit derived from vinyl acetate. For example, the ethylene vinyl acetate copolymer may include about 60 wt % to about 75 wt % of the structural unit derived from ethylene and about 25 wt % to about 40 wt % of the structural unit derived from vinyl acetate. A thermoplastic resin composition having improved impact resistance may be obtained when the amount of the structural unit derived from vinyl acetate is within the above range.

When the amount of the structural unit derived from vinyl acetate is excessively low, it may be difficult for the thermoplastic polymer to have molecular interaction with the polylactic acid during molding, and thus, the compatibility may be reduced and the impact resistance may not be improved. When the amount of the structural unit derived from vinyl acetate is excessively high, a particle size of the polymer may be decreased due to the excessively high compatibility during molding, and thus, the impact resistance may rather be reduced.

The expression "improved productivity" denotes that a thermoplastic resin composition having excellent heat resistance and impact resistance may be obtained even under severe molding conditions compared, for instance, to a comparative resin as set forth in the Examples.

The severe molding conditions, for example, may include a molding temperature of about 100° C. or less and a molding time of about 10 minutes or less. For example, the severe molding conditions may include a molding temperature of about 100° C. or less and a molding time of about 5 minutes or less. For example, the severe molding conditions may include a molding temperature of about 100° C. or less and a molding time of about 4 minutes or less. For example, the severe molding conditions may include a molding temperature of about 100° C. or less and a molding time of about 3 minutes or less. For example, the severe molding conditions may include a molding temperature of about 100° C. or less and a molding time of about 150 seconds or less. For example, the severe molding conditions may include a molding temperature of about 100° C. or less and a molding time of about 2 minutes or less. For example, the severe molding conditions may include a molding temperature of about 100° C. or less and a molding time of about 1 minute or less.

In the thermoplastic resin composition, an amount of the thermoplastic polymer having a lower glass transition temperature than the polylactic acid may be in a range of about 3 wt % to about 20 wt % based on a total weight of the thermoplastic resin composition. For example, the amount of thermoplastic polymer may be in a range of about 3 wt % to about 15 wt % based on the total weight of the thermoplastic resin composition. For example, the amount of thermoplastic polymer may be in a range of about 3 wt % to about 13 wt % based on the total weight of the thermoplastic resin composition. For example, the amount of thermoplastic polymer may be in a range of about 3 wt % to about 12 wt % based on the total weight of the thermoplastic resin composition. Within the above range of the amount of the thermoplastic polymer, a thermoplastic resin composition having improved productivity, heat resistance, and impact resistance compared, for instance, to a comparative resin as set forth in the Examples, may be obtained. When the amount of the thermoplastic polymer having a lower glass transition temperature than the polylactic acid is excessively low, the impact resistance may be reduced, and when the amount of the thermoplastic polymer is excessively high, the heat resistance may be reduced.

The nucleating agent in the thermoplastic resin composition may comprise at least one of an inorganic nucleating agent and an organic nucleating agent. The inorganic nucleating agent refers to a nucleating agent formed from an inorganic compound, and the organic nucleating agent denotes a nucleating agent which includes a low molecular weight organic compound, an organometallic compound, a metal salt of an organic compound, or a high molecular weight organic compound. The crystallization rate may be improved by including the nucleating agent.

The inorganic nucleating agent may be at least one selected from the group consisting of talc, kaolinite, montmorillonite, mica, clay, zeolite, silica, graphite, carbon black, barium sulfate, calcium silicate, calcium carbonate, calcium sulfide, calcium titanate, zinc oxide, aluminum oxide, magnesium oxide, titanium oxide, neodymium oxide, and boron nitride. However, the inorganic nucleating agent is not necessarily limited thereto and any inorganic nucleating agent may be used as long as it is used as an inorganic nucleating agent which improves the crystallization rate, heat resistance, and mechanical properties within a range of not reducing the impact resistance of a molded article in the art.

The organic nucleating agent may be at least one selected from the group consisting of poly-D-lactic acid, low-density polyethylene, high-density polyethylene, polypropylene, polyisopropylene, polybutene, poly-4-methylpentene, poly-3-methylbutene-1, polyvinylcycloalkane, polyvinyltrialkylsilane, polybutylene terephthalate, stearic acid amide, ethylene bislauric acid amide, palmitic acid amide, hydroxystearic acid amide, erucic acid amide, tris(t-butylamide) trimesate, hexamethylene-bis-9,10-dihydroxy stearic acid amide, p-xylene-bis-9,10-dihydroxy stearic acid amide, 1,4-cyclohexane dicarboxylic acid dicyclohexylamide, 2,6-naphthalene dicarboxylic acid dianilide, N,N',N''-tricyclohexyl trimesic acid amide, trimesic acid tris(t-butylamide), 1,4-cyclohexane dicarboxylic acid dianilide, 2,6-naphthalene dicarboxylic acid dicyclohexylamide, N,N'-dibenzoyl-1,4-diaminocyclohexane, N,N'-dicyclohexane carbonyl-1,5-diaminonaphthalene, ethylene-bisstearic acid amide, N,N'-ethylene-bis(12-hydroxy stearic acid)amide, decane dicarboxylic acid dibenzoylhydrazide, hexane dicarboxylic acid dibenzoylhydrazide, octane dicarboxylic acid dibenzoylhydrazide, sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, sodium cyclohexane carboxylate, sodium p-toluene sulfonate, dimethyl-5-sodium sulfoisophthalate, sodium sulfoisophthalate, sodium-2,2'-methylenebis(4,6-di-t-butylphenyl)phosphate, aluminum bis(2,2-methylenebis-4,6-di-t-butylphenyl phosphate)hydroxide, benzylidene sorbitol, copper phthalocyanine, and zinc phenylphosphonate. However, the organic nucleating agent is not necessarily limited thereto and any organic nucleating agent may be used as long as it is used in the art.

For example, since the poly-D-lactic acid in the organic nucleating agent may increase the crystallization rate by forming a stereo complex with poly-L-lactic acid, the poly-D-lactic acid may improve the heat resistance compared, for instance, to a comparative resin as set forth in the Examples. Further, since the poly-L-lactic acid may increase the crystallization rate by forming a stereo complex with the poly-D-lactic acid, the poly-L-lactic acid may improve the heat resistance compared, for instance, to a comparative resin as set forth in the Examples.

In the thermoplastic resin composition, an amount of the nucleating agent may be in a range of about 0.1 wt % to about 10 wt % based on the total weight of the thermoplastic resin composition. For example, the amount of the nucleating agent may be in a range of about 0.5 wt % to about 9 wt % based on the total weight of the thermoplastic resin composition. For example, the amount of the nucleating agent may be in a range of about 1 wt % to about 8 wt % based on the total weight of the thermoplastic resin composition. For example, the amount of the nucleating agent may be in a range of about 1 wt % to about 7 wt % based on the total weight of the thermoplastic resin composition. A thermoplastic resin composition having improved productivity, heat resistance, and impact resistance compared, for instance, to a comparative resin as set forth in the Examples, may be obtained within the above range of the amount of the nucleating agent. When the amount of the nucleating agent is excessively low, the crystallization rate may not be improved due to low crystallization rate. Thus, the productivity under severe molding conditions may be reduced. When the amount of the nucleating agent is excessively high, the impact resistance may be reduced. The severe molding conditions are the same as described above.

The reactive plasticizer may be at least one selected from the group consisting of modified vegetable oil, unmodified polyglycerol fatty acid ester, and modified polyglycerol fatty acid ester. More specific examples of a reactive plasticizer include epoxidized vegetable oil, acrylated vegetable oil, maleated vegetable oil, and acrylated-epoxidized vegetable oil. The vegetable oil may be, for instance, soybean oil. However, the reactive plasticizer is not necessarily limited thereto and any reactive plasticizer may be used.

An amount of the reactive plasticizer in the thermoplastic resin composition may be in a range of about 3 wt % to about 20 wt % based on the total weight of the thermoplastic resin composition. For example, the amount of the reactive plasticizer may be in a range of about 3 wt % to about 15 wt % based on the total weight of the thermoplastic resin composition. For example, the amount of the reactive plasticizer may be in a range of about 3 wt % to about 10 wt % based on the total weight of the thermoplastic resin composition. A thermoplastic resin composition having improved productivity, heat resistance, and impact resistance compared, for instance, to a comparative resin as set forth in the Examples, may be obtained within the above range of the amount of the reactive plasticizer. When the amount of the reactive plasticizer is excessively low, the crystallization rate may be decreased to reduce the productivity under severe molding conditions, and when the amount of the reactive plasticizer is excessively high, the heat resistance may be reduced.

An amount of the polylactic acid in the thermoplastic resin composition may be about 70 wt % or more based on the total weight of the thermoplastic resin composition. For example, the amount of the polylactic acid may be about 75 wt % or more based on the total weight of the thermoplastic resin composition. For example, the amount of the polylactic acid may be about 80 wt % or more based on the total weight of the thermoplastic resin composition. For example, the amount of the polylactic acid may be about 85 wt % or more based on the total weight of the thermoplastic resin composition. For example, the amount of the polylactic acid may be about 90 wt % or more based on the total weight of the thermoplastic resin composition. A thermoplastic resin composition having improved productivity, heat resistance, and impact resistance compared, for instance, to a comparative resin as set forth in the Examples, may be obtained within the above range of the amount of the polylactic acid.

The polylactic acid in the thermoplastic resin composition may be poly-L-lactic acid (PLLA) including a repeating unit of Formula 1 below.

<Formula 1>

An acidity of the poly-L-lactic acid may be about 50 meq/kg or less. Although the acidity of the poly-L-lactic acid is not necessarily limited to the above range, more improved physical properties may be provided within the above acidity range. For example, the acidity of the poly-L-lactic acid may be in a range of about 1 meq/kg to about 50 meq/kg. For example, the acidity of the poly-L-lactic acid may be in a range of about 1 meq/kg to about 30 meq/kg. For example, the acidity of the poly-L-lactic acid may be in a range of about 1 meq/kg to about 10 meq/kg. For example, the acidity of the poly-L-lactic acid may be in a range of about 2 meq/kg to about 5 meq/kg.

A weight-average molecular weight of the poly-L-lactic acid may be in a range of about 10,000 Daltons to about 500,000 Daltons. For example, the weight-average molecular weight of the poly-L-lactic acid may be in a range of about 100,000 Daltons to about 300,000 Daltons. In a case where the weight-average molecular weight of the poly-L-lactic acid is less than about 10,000 Daltons, mechanical properties of the thermoplastic resin composition may deteriorate, and in a case where the weight-average molecular weight is greater than about 500,000 Daltons, processing may be difficult. As a result of gel permeation chromatography (GPC) analysis, a weight-average molecular weight of the polu-L-lactic acid (PLLA) can be determined. The GPC analysis can be performed using polystyrene as a standard and tetrahydrofuran as a solvent.

An optical purity of the poly-L-lactic acid may be about 90% or more. For example, the optical purity of the poly-L-lactic acid may be about 93% or more. For example, the optical purity of the poly-L-lactic acid may be about 95% or more. For example, the optical purity of the poly-L-lactic acid may be about 97% or more. When the optical purity of the poly-L-lactic acid is about 90% or less, the mechanical properties may deteriorate.

The thermoplastic resin composition, for example, may include about 70 wt % to about 95 wt % of the polylactic acid, about 2 wt % to about 20 wt % of the thermoplastic polymer having good compatibility with the polylatic acid as well as a lower glass transition temperature than the polylactic acid, about 0.1 wt % to about 10 wt % of the nucleating agent, and about 2 wt % to about 20 wt % of the reactive plasticizer. A thermoplastic resin composition having improved productivity, heat resistance, and impact resistance may be obtained within the composition range of the thermoplastic resin composition.

The thermoplastic resin composition may have an Izod impact strength of about 90 J/m or more and a heat distortion temperature (HDT) of about 50° C. or more under molding conditions including a molding temperature of about 50° C. or more and a cooling time of about 150 seconds or less. For example, the Izod impact strength may be 100 J/m or more and the HDT may be about 100° C. or more under the molding conditions including a molding temperature of about 50° C. or more and a cooling time of about 150 seconds or less. For example, the Izod impact strength may be 100 J/m or more and the HDT may be about 100° C. or more under molding conditions including a molding temperature of about 100° C. or more and a cooling time of about 120 seconds or less. For example, the Izod impact strength may be 100 J/m or more and the HDT may be about 80° C. or more under the molding conditions including a molding temperature of about 50° C. or more and a cooling time of about 150 seconds or less. Since the thermoplastic resin composition may have an Izod impact strength of about 90 J/m or more and an HDT of about 50° C. or more under the molding conditions including a molding temperature of about 50° C. or more and a cooling time of about 150 seconds or less, the productivity may be significantly improved compared, for instance, to a comparative resin as set forth in the Examples.

The thermoplastic resin composition molded under molding conditions including a molding temperature of about 100° C. and a cooling time of about 150 seconds or less may have an Izod impact strength of about 100 J/m or more and an HDT of about 80° C. or more. For example, the thermoplastic resin composition molded under molding conditions including a molding temperature of about 100° C. and a cooling time of about 130 seconds or less may have an Izod impact strength of about 100 J/m or more and an HDT of about 80° C. or more. For example, the thermoplastic resin composition molded under molding conditions including a molding temperature of about 100° C. and a cooling time of about 120 seconds or less may have an Izod impact strength of about 100 J/m or more and an HDT of about 80° C. or more.

In the thermoplastic resin composition, an Izod impact strength of the thermoplastic resin composition molded under molding conditions including a molding temperature of about 100° C. and a cooling time of about 60 seconds may be about 65% or more of an Izod impact strength of a thermoplastic resin composition of the same type that is molded under molding conditions including a molding temperature of about 100° C. and a cooling time of about 600 seconds. That is, in a case where the Izod impact strength of the thermoplastic resin composition molded under the molding conditions including a molding temperature of about 100° C. and a cooling time of about 600 seconds is about 100, the Izod impact strength of the thermoplastic resin composition of the same type that is molded under the molding conditions including a molding temperature of about 100° C. and a cooling time of about 60 seconds may be about 65 or more. For example, the Izod impact strength of the thermoplastic resin composition molded under the molding conditions including a molding temperature of about 100° C. and a cooling time of about 60 seconds may be about 67% or more of the Izod impact strength of the thermoplastic resin composition of the same type that is molded under the molding conditions including a molding temperature of about 100° C. and a cooling time of about 600 seconds. For example, the Izod impact strength of the thermoplastic resin composition molded under the molding conditions including a molding temperature of about 100° C. and a cooling time of about 60 seconds may be about 70% or more of the Izod impact strength of the thermoplastic resin composition of the same type that is molded under the molding conditions including a molding temperature of about 100° C. and a cooling time of about 600 seconds.

The thermoplastic resin composition may be a liquid or solid at a temperature of 25° C. and pressure of 1 atm, and may be molded into a final product (e.g., a molded article, a film, or a textile). The final product (e.g., a molded article, textile, or film) may be manufactured by methods known in the art.

The thermoplastic resin composition may further include other additives typically used in resin compositions.

For example, the additive, such as a filler, a terminal blocking agent, a metal deactivator, an antioxidant, a heat stabilizer, an ultraviolet absorber, a lubricant, a tackifier, a plasticizer, a cross-linking agent, a viscosity modifier, an antistatic agent, a flavouring agent, an antibacterial agent, a dispersant, and a polymerization inhibitor, may be added within a range that does not adversely affect the physical properties of the resin composition.

Fillers include, for example, an inorganic filler, such as wollastonite, mica, clay, montmorillonite, smectite, kaoline, zeolite (aluminum silicate), and anhydrous amorphous aluminum silicate obtained by performing an acid treatment and a heat treatment on zeolite, may be used as the filler. In a case where the filler is included, an amount of the filler in the resin composition may be in a range of about 1 wt % to about 20 wt % based on the total weight of the resin composition in order to maintain impact strength of the molded article.

The thermoplastic resin composition may include a carbodiimide compound, such as a polycarbodiimide compound or a monocarbodiimide compound, as the terminal blocking agent. Since the above compound reacts with a part or all of a terminal carboxyl group of a polylactic acid resin to block side reactions such as hydrolysis, water resistance of the molded article including the thermoplastic resin composition may be improved. Thus, durability of the molded article including the thermoplastic resin composition under high temperature and high humidity environments may be improved compared, for instance, to a comparative resin as set forth in the Examples.

The polycarbodiimide compound, for example, may include poly(4,4'-diphenylmethane carbodiimide), poly(4,4'-dicyclohexylmethane carbodiimide), poly(1,3,5-triisopropyl benzene) polycarbodiimide, and poly(1,3,5-triisopropylbenzene and 1,5-diisopropylbenzene) polycarbodiimide. The monocarbodiimide compound, for example, may include N,N'-di-2,6-diisopropylphenyl carbodiimide.

An amount of the carbodiimide compound may be in a range of about 0.1 wt % to about 3 wt % based on the total weight of the thermoplastic resin composition. In a case where the amount of the carbodiimide compound is less than about 0.1 wt %, the improvement of the durability of the molded article may be insignificant, and in a case where the amount of the carbodiimide compound is greater than about 3 wt %, mechanical strength of the molded article may deteriorate.

The thermoplastic resin composition may include a stabilizer or a colorant in order to stabilize the molecular weight or color during molding. A phosphorus-based stabilizer, a hindered phenol-based stabilizer, an ultraviolet absorber, a heat stabilizer, and an antistatic agent may be used as the stabilizer.

Phosphorous acid, phosphoric acid, phosphonic acid, esters thereof (phosphite compound, phosphate compound, phosphonite compound, phosphonate compound, etc.), and tertiary phosphine may be used as the phosphorus-based stabilizer.

Sandostab P-EPQ (Clariant) and Irgafos P-EPQ (CIBA SPECIALTY CHEMICALS) may be used as a stabilizer including the phosphonite compound as a main component.

PEP-8 (Asahi Denka Kogyo), JPP681S (Tohoku Chemical Co., Ltd.), PEP-24G (Asahi Denka Kogyo), Alkanox P-24 (Great Lakes), Ultranox P626 (GE Specialty Chemicals), Doverphos S-9432 (Dover Chemical), Irgaofos126, 126 FF (CIBA SPECIALTY CHEMICALS), PEP-36 (Asahi Denka Kogyo), PEP-45 (Asahi Denka Kogyo), and Doverphos S-9228 (Dover Chemical) may be used as a stabilizer including the phosphite compound as a main component.

Hindered phenol-based stabilizers (antioxidants) include any compounds typically used in resin compositions for this purpose. For example, 3,9-bis[2-{3-(3-t-butyl-4-hydroxy-5-methylphenyl)propionyloxy}-1,1-dimethylethyl]-2,4,8,10-tetraoxaspiro[5,5]undecane may be used as the hindered phenol-based stabilizer. However, the hindered phenol-based stabilizer is not limited thereto, and any hindered phenol-based compound may be used as the hindered phenol-based stabilizer so long as it is used as an oxidation stabilizer of a resin composition in the art.

An amount of the phosphorus-based stabilizer and the hindered phenol-based antioxidant in the resin composition may be in a range of about 0.005 wt % to about 1 wt % based on the total weight of the resin composition.

The thermoplastic resin composition may include an ultraviolet absorber. The deterioration of weather resistance of the molded article due to the effect of a rubber component or flame retardant may be suppressed by including the ultraviolet absorber. A benzophenone-based ultraviolet absorber, a benzotriazole-based ultraviolet absorber, a hydroxyphenyltriazine-based ultraviolet absorber, a cyclic imino ester-based ultraviolet absorber, and a cyanoacrylate-based ultraviolet absorber may be used as the ultraviolet absorber. An amount of the ultraviolet absorber in the thermoplastic resin composition may be in a range of about 0.01 wt % to about 2 wt % based on the total weight of the resin composition.

The thermoplastic resin composition may include a dye or pigment as a colorant in order to provide various colors to the molded article.

The thermoplastic resin composition may include an antistatic agent in order to provide antistatic performance to the molded article.

The thermoplastic resin composition may contain a thermoplastic resin other than the above-described resin, a flow modifier, an antibacterial agent, a dispersant such as liquid paraffin, a photocatalytic antifouling agent, an infra-red (IR) absorber, and a photochromic agent.

Also provided is a molded article comprising the thermoplastic resin composition described herein, as well as a method of making a molded article by forming the thermoplastic resin composition into a desired shape.

The thermoplastic resin composition may be obtained by reaction kneading or melt-kneading the above each component with various types of extruders, a Banbury mixer, a kneader, a continuous kneader, and a roll. During the kneading, the above each component may be added collectively or dividedly. Alternatively, the above each component may be dissolved in a solvent and mixed. Then, the thermoplastic resin composition may be prepared by removing the solvent. The thermoplastic resin composition thus prepared may be used to obtain a molded article by a known molding method such as injection molding, press molding, calendar molding, T-die extrusion molding, hollow sheet extrusion molding, foam sheet extrusion molding, inflation molding, lamination molding, vacuum molding, profile extrusion molding, or a combined method thereof.

In a case where a kneader, such as a kneading extruder and a Banbury mixer, is connected to a calendar molding machine, T-die extrusion molding machine, or inflation molding machine, the thermoplastic resin composition is not first prepared, but a molded article may be prepared at the same time when the thermoplastic resin composition is obtained by the connected kneader.

The molded article prepared using the thermoplastic resin composition may be used for various applications without any restriction. For example, the molded article may be used for medical use such as a vascular graft, a cell carrier, a drug carrier, and a gene carrier. Further, the molded article may be used as interior and exterior materials of various general-purpose items. For example, the molded article may be used as interior and exterior materials of household appliances, communication equipment, and industrial equipment. Further, the molded article may be used in generic product areas such as cases such as a relay case, a wafer case, a reticle case, and a mask case; trays such as a liquid crystal tray, a chip tray, a hard disk tray, a charge coupled device (CCD) tray, an integrated circuit (IC) tray, an organic electroluminescence (EL) tray, an optical pickup tray, and a light-emitting diode (LED) tray; carriers such as an IC carrier; films such as a polarizing film, a light guide plate, protective films for various lenses, a sheet used during cutting a polarizing film, and a sheet used in a clean room such as a partition plate; an inner member of an automatic vending machine, antistatic bags used in a liquid crystal panel, a hard disk, and a plasma panel, corrugated plastic, carrying cases for a liquid crystal panel, a liquid crystal cell, and a plasma panel, and other members for carrying various parts.

In one embodiment, a method of preparing a thermoplastic resin composition according to another embodiment of the present disclosure may include: mixing a polylactic acid, a thermoplastic polymer having good compatibility with the polylatic acid as well as a lower glass transition temperature than the polylactic acid, a nucleating agent, and a reactive plasticizer to form a mixture; and molding the mixture obtained in the mixing, wherein the molding is performed at a molding temperature of about 50° C. or more and a cooling time of about 150 seconds or less.

Since the method of preparing a thermoplastic resin composition may provide a thermoplastic resin composition having improved heat resistance and impact resistance compared, for instance, to a comparative resin as set forth in the Examples, even at a molding temperature of about 50° C. or more and a cooling time of about 150 seconds or less by mixing and molding the polylactic acid, the thermoplastic polymer having good compatibility with the polylactic acid as well as a lower glass transition temperature than the polylactic acid, the nucleating agent, and the reactive plasticizer, productivity may be very high compared, for instance, to a comparative resin as set forth in the Examples.

For example, the thermoplastic resin composition prepared by the method of preparing a thermoplastic resin composition may have an Izod impact strength of about 90 J/m or more and a heat distortion temperature (HDT) of about 50° C. or more under molding conditions including a molding temperature of about 50° C. or more and a cooling time of about 150 seconds or less.

Further, with the thermoplastic resin composition prepared by the method of preparing a thermoplastic resin composition, an Izod impact strength of the thermoplastic resin composition molded at a molding temperature of about 100° C. and a cooling time of about 60 seconds may be about 50 J/m or more and may be about 63% or more of an Izod impact strength of a thermoplastic resin composition of the same type that is molded at a molding temperature of about 100° C. and a cooling time of about 600 seconds.

The method of preparing a thermoplastic resin composition may be performed without performing an additional heat treatment after the molding is performed. Thus, the productivity may be significantly improved in comparison to a typical method of preparing a thermoplastic resin composition which requires an additional heat treatment.

The method of preparing a thermoplastic resin composition may also be performed by injection molding.

The present disclosure is described in more detail according to examples and comparative examples below. However, the examples only exemplify the present disclosure, and the scope of the present disclosure is not limited thereto.

(Preparation of Thermo Plastic Resin Composition)

Examples 1 to 13 and Comparative Examples 1 to 10

Starting materials were dry blended in which poly-L-lactic acid (PLLA, Nature Works 4032D) as a polylactic acid, poly(ethylene-co-vinyl acetate) (Sigma-Aldrich Co., Ltd.) as a thermoplastic polymer having good compatibility with the polylatic acid as well as a lower glass transition temperature than the polylactic acid, ultra-fine talc having an average particle diameter of about 2 µm as a nucleating agent, and a modified vegetable oil (epoxidized soybean oil, ESO, Sajo Haepyo) as a reactive plasticizer were prepared at weight ratios listed in the following Table 2. Then, extrudates, which were obtained by performing melt compounding at an extrusion temperature of about 210° C. and a rotational speed of about 70 rpm in a twin screw extruder (Process 11 Haake 11 mm mini twin screw extruder, Thermo Scientific) having a barrel diameter of about 11 mm and a barrel length/barrel diameter (L/D) ratio of about 40, were dried at about 40° C. for about 24 hours in a vacuum of about 5 torr to prepared thermoplastic resin compositions. Compositions of the thermoplastic resin compositions are presented in Tables 1 and 2 below.

Materials Used in Resin Compositions 1) poly-L-lactic acid: PLLA (Nature Works 4032D) was obtained and used as it is as a polylactic acid, 2) ethylene vinyl acetate: products manufactured by Sigma-Aldrich Co., Ltd., in which amounts of a repeating unit derived from vinyl acetate (VA) were respectively about 28 wt %, 33 wt %, and 40 wt % based on a total weight of the entire repeating unit, were obtained and used as they are, 3) talc: ultra fine talc having an average particle diameter of about 2 microns or less was used as an inorganic nucleating agent, 4) poly-D-lactic acid: PDLA (Synbra PDLA 1010) was obtained and used as it is as an organic nucleating agent, 5) SO (soybean oil): a product manufactured by Sigma-Aldrich Co., Ltd. was obtained and used as it is, 6) epoxidized soybean oil (ESO): soybean oil having an epoxy group content of about 4% or more manufactured by Sajo Haepyo was used, 7) acrylated epoxidized soybean oil (AESO): a product manufactured by Sigma-Aldrich Co., Ltd. was obtained and used as it is, 8) Zinc phenylphosphonate: Ecopromote (commercial organic nucleating agent, Nissan Chemical Industries) was obtained and used as it is, 9) dimethyl 5-sulfoisophthalate potassium salt: LAK 301 (commercial organic nucleating agent, Takemoto Oil & Fat) was obtained and used as it is, 10) Polyglycerol fatty acid ester: Mitsubishi Kagaku Foods Corporation 0-50D (degree of polymerization: about 10, ratio of esterification: about 43%, C18 fatty acid (oleic acid), modified polyglycerol fatty acid ester) was obtained and used as it is.

Preparation of $I_{ZOD}$ Impact Strength Specimens

Specimens (about 64 mm (length)×about 12 mm (width)×about 3 mm (depth)) for Izod test according to ASTM D256 were prepared from the extrudates, as the thermoplastic resin compositions, by using an injection molding apparatus (Haake Minijet Injection Molding System, Thermo Scientific) under conditions including a resin melt temperature of about 180° C. to about 220° C., an injection pressure of about 500 bar to about 1,000 bar, a molding temperature of about 100° C., and a cooling time (molding time) of about 30 seconds to about 300 seconds. Then, notching was performed by using a notching machine by Toyoseiki. Specific molding conditions are presented in Tables 1 and 2 below.

Preparation of Heat Distortion Temperature (HDT) Specimens

Specimens (about 128 mm (length)×about 12 mm (width)×about 6 mm (depth)) for HDT test according to ASTM D648 were prepared from the extrudates, as the thermoplastic resin compositions, by using an injection molding apparatus (Semi Auto Injection Molding System, Toyoseiki) under conditions including a resin melt temperature of about 180° C. to about 220° C., an injection pressure of about 500 bar to about 1,000 bar, a mold temperature of about 80° C. to about 100° C., and an injection time (molding time) of about 30 seconds to about 300 seconds. Specific molding conditions are presented in Tables 1 and 2 below.

Evaluation Example 1

Nuclear Magnetic Resonance (NMR) Analysis

NMR spectrums of ESO alone and a mixture (amount of ESO: 10 wt %) of ESO and polylactic acid (PLLA, Nature Works 4032D) were measured using a 600 MHz Bruker NMR (ADVANCE III) spectrometer.

According to the measurement results, with respect to the ESO alone, a peak corresponding to an epoxy group was clearly observed, but with respect to the mixture of ESO and polylactic acid, the peak corresponding to an epoxy group was significantly deceased. Thus, it was confirmed that the epoxy group of the ESO reacted with the polylactic acid to form a chemical bond.

Evaluation Example 2

Transmission Electron Microscope (TEM) Analysis

TEM analysis was performed on the thermoplastic resin compositions prepared in Example 3 and Comparative Example 9 to compare the degree of the dispersion of the thermoplastic polymers.

Figure 1A:
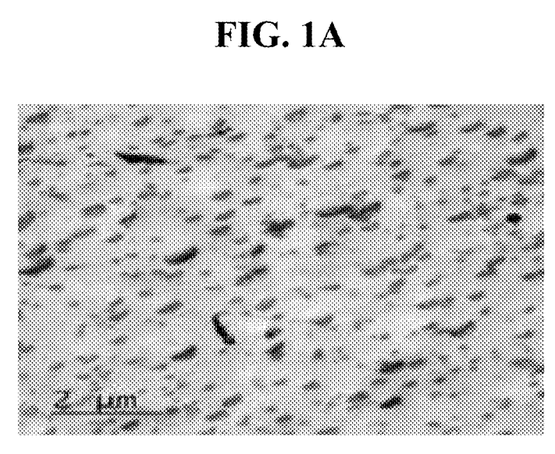
FIG. 1A is a transmission electron microscope (TEM) image of a thermoplastic resin composition prepared in Example 3.
Figure 1B:
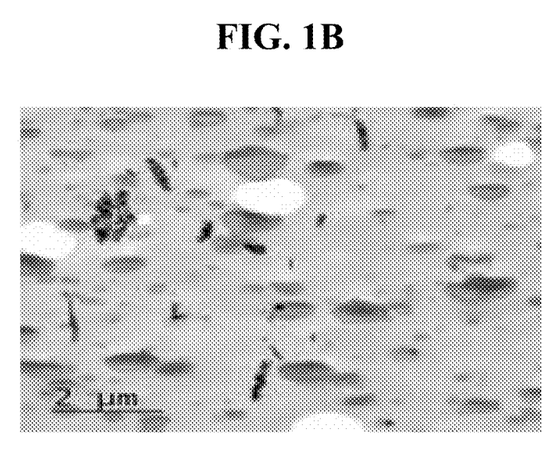
FIG. 1B is a TEM image of a thermoplastic resin composition prepared in Comparative Example 9.

As illustrated in FIGS. 1A and 1B, it may be understood that the thermoplastic polymer (ethylene vinyl acetate (EVA)) of the thermoplastic resin composition prepared in Example 3 was smaller and more uniformly dispersed than that of the thermoplastic resin composition prepared in Comparative Example 9. Thus, the thermoplastic resin composition prepared in Example 3 may provide further improved impact resistance.

Evaluation Example 3

Impact Strength Measurement

Izod impact strength was measured by performing a notched Izod impact test according to the ASTM D256 test method. The results thereof are presented in Tables 1 and 2 below.

Evaluation Example 4

Heat Distortion Temperature (HDT) Measurement

Heat distortion temperatures at which the specimens deflected by about 0.254 mm were measured according to the ASTM D648 test method under a load of about 0.45 MPa while increasing the temperature from room temperature at a rate of about 2° C./min. The results thereof are presented in Tables 1 and 2 below.

TABLE 1

| | Resin composition [wt %] | | | | Physical properties | |
| | | | | Nucleating | IZOD impact strength [J/m] | |
| | PLLA | EVA | Plasticizer | agent | | |
|---|---|---|---|---|---|---|
| Molding conditions (molding temperature/cooling time) | — | — | — | — | 100° C./600 sec | 100° C./60 sec |
| Comparative Example 1 | 100 | — | — | — | 49 | 36 |
| Comparative Example 2 | 90 | — | 10(SO) | — | 88 | 44 |
| Comparative Example 3 | 90 | — | 10(AESO) | — | 137 | 47 |
| Comparative Example 4 | 90 | — | 10(ESO) | — | 257 | 57 |
| Comparative Example 5 | 90 | 10 (VA 40 wt %) | — | — | 348 | 63 |
| Comparative Example 6 | 90 | 5 (VA 40 wt %) | 5(ESO) | — | 244 | 52 |
| Comparative Example 7 | 98 | — | — | 2(talc) | 49 | 45 |
| Comparative Example 8 | 88 | — | 10(ESO) | 2(talc) | 197 | 105 |
| Comparative Example 9 | 88 | 10 (VA 40 wt %) | — | 2(talc) | 216 | 106 |
| Comparative Example 10 | 93 | 5 (VA 40 wt %) | — | 2(talc) | 107 | 66 |
| Example 1 | 88 | 5 (VA 28 wt %) | 5(ESO) | 2(talc) | 168 | 144 |
| Example 2 | 88 | 5 (VA 33 wt %) | 5(ESO) | 2(talc) | 200 | 190 |
| Example 3 | 88 | 5 (VA 40 wt %) | 5(ESO) | 2(talc) | 235 | 230 |

As illustrated in Table 1, the polylactic acid of Comparative Example 1 exhibited low impact strength regardless of the cooling time. Impact resistances of the thermoplastic resin compositions including the plasticizers of Comparative Examples 2 to 4 were improved as the cooling time was increased by about 10 times. It was understood that the improvement of the impact resistance was due to the fact that a reactive functional group of the reactive plasticizer having good flowability may form a chemical bond by reacting with an end of the polylactic acid. However, in a case where the cooling time was about 60 seconds, impact strength similar to that of the polylactic acid was exhibited. With respect to Comparative Example 5 including the thermoplastic polymer (EVA), a trend similar to those of Comparative Examples 2 to 4 was also exhibited.

Impact resistances at a cooling time of about 60 seconds of the thermoplastic resin compositions including the nucleating agent (talc) of Comparative Examples 7 to 10 were improved in comparison to those of the thermoplastic resin compositions including the plasticizer. For example, the impact resistances at a cooling time of about 60 seconds of Comparative Examples 8 and 9 were respectively improved by about 2 times in comparison to those of Comparative Examples 4 and 5. It was understood that the improvement of the impact resistance was due to the reduction of nucleation time. However, in a case where the cooling time was about 60 seconds, the impact resistance was still decreased in comparison to a case where the cooling time was about 600 seconds.

In contrast, the thermoplastic resin compositions of Examples 1 to 3 maintained high impact resistances even when the cooling time was decreased by about 1/10. Further, with respect to the thermoplastic resin compositions of Examples 1 to 3, the impact resistances were improved as the amount of the VA in the EVA thermoplastic polymer was increased. It was understood that the improvement of the impact resistance was due to the fact that compatibility was improved by molecular interaction between the polylactic acid and the vinyl acetate.

TABLE 2

| | Resin composition [wt %] | | | | Physical properties | | |
| | | EVA | | Nucleating | IZOD impact strength [J/m] | | HDT [° C.] |
| | PLLA | (VA 40 wt %) | Plasticizer | agent | | | |
|---|---|---|---|---|---|---|---|
| Molding conditions (molding temperature/cooling time) | — | — | — | — | 100° C./120 sec | 100° C./60 sec | 100° C./120 sec |
| Comparative Example 1 | 100 | — | — | — | 45 | 36 | 60 |
| Example 3 | 88 | 5 | 5(ESO) | 2(talc) | 235 | 230 | 80 |
| Example 4 | 87 | 5 | 3(ESO) + 3(AESO) | 2(talc) | 194 | 130 | 131 |

TABLE 2-continued

| | Resin composition [wt %] | | | | Physical properties | |
| | | EVA | | Nucleating | | |
| | PLLA | (VA 40 wt %) | Plasticizer | agent | IZOD impact strength [J/m] | HDT [° C.] |
|---|---|---|---|---|---|---|
| Example 5 | 82 | 5 | 3(ESO) + 3(AESO) | 2(talc) + 5(PDLA) | 168 148 | 134 |
| Example 6 | 80 | 7 | 3(ESO) + 3(AESO) | 2(talc) + 5(PDLA) | 180 153 | 127 |
| Example 7 | 77 | 10 | 3(ESO) + 3(AESO) | 2(talc) + 5(PDLA) | 164 130 | 113 |
| Example 8 | 84 | 5 | 5(ESO) | 1(Ecopromote) + 5(PDLA) | 268 237 | 137 |
| Example 9 | 83 | 5 | 3(ESO) + 3(AESO) | 1(Ecopromote) + 5(PDLA) | 207 202 | 144 |
| Example 10 | 88 | 5 | 5(ESO) | 2(LAK) | 173 167 | 145 |
| Example 11 | 87 | 5 | 3(ESO) + 3(AESO) | 2(LAK) | 128 124 | 121 |
| Example 12 | 83 | 5 | 5(ESO) | 2(LAK) + 5(PDLA) | 134 117 | 140 |
| Example 13 | 82 | 5 | 5(ESO) 1(polyglycerol fatty acid ester) | 2(talc) + 5(PDLA) | 217 206 | 102 |

As illustrated in Table 2, heat resistances of Examples 4 to 13 were further improved in comparison to that of Example 3 by the additional use of the plasticizer and the nucleating agent.

Further, impact resistances and heat resistances of Examples 3 to 13 were simultaneously improved in comparison to those of the polylactic acid of Comparative Example 1.

In particular, the thermoplastic resin compositions of Examples 3 to 13 had an Izod impact strength of about 90 J/m or more and an HDT of about 50° C. or more under molding conditions including a molding temperature of about 50° C. or more and a cooling time of about 150 seconds or less.

As described above, according to the one or more of the above exemplary embodiments, productivity, heat resistance, and impact resistance of a thermoplastic resin composition may be simultaneously improved by including a thermoplastic polymer having good compatibility with a polylactic acid as well as a lower glass transition temperature than the polylactic acid, a nucleating agent, and a reactive plasticizer.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the FIGURES, it will be understood by those of ordinary skill in the art that various changes in form and details may be made therein without departing from the spirit and scope as defined by the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A thermoplastic resin composition comprising:
   a polylactic acid;
   a thermoplastic polymer having a lower glass transition temperature than the polylactic acid;
   an inorganic nucleating agent; and
   at least two reactive plasticizers comprising a modified vegetable oil,
   wherein the thermoplastic resin composition comprises about 70% or more of the polylactic acid based on the total weight of the thermoplastic resin composition,
   wherein the thermoplastic polymer comprises an ethylene vinyl acetate copolymer, which comprises about 60 wt % to about 75 wt % of an ethylene-based structural unit and about 25 wt % to about 40 wt % of a vinyl-acetate based structural unit.

2. The thermoplastic resin composition of claim 1, wherein the thermoplastic polymer comprises an olefin-based thermoplastic polymer.

3. The thermoplastic resin composition of claim 1, wherein the thermoplastic polymer is an ethylene vinyl acetate copolymer; an ethylene (meth)acrylate ester copolymer; or an olefin-based polymer which includes at least one functional group selected from the group consisting of an acid anhydride group, a carboxyl group, an amino group, an imino group, an alkoxysilyl group, a silanol group, a silyl ether group, a hydroxyl group, and an epoxy group; or a combination thereof.

4. The thermoplastic resin composition of claim 1, wherein the thermoplastic polymer is about 3 wt % to about 20 wt % of the total weight of the thermoplastic resin composition.

5. The thermoplastic resin composition of claim 1, wherein the resin composition further comprises an organic nucleating agent.

6. The thermoplastic resin composition of claim 1, wherein the inorganic nucleating agent comprises talc, kaolinite, montmorillonite, mica, clay, zeolite, silica, graphite, carbon black, barium sulfate, calcium silicate, calcium carbonate, calcium sulfide, calcium titanate, zinc oxide, aluminum oxide, magnesium oxide, titanium oxide, neodymium oxide, boron nitride, or a combination thereof.

7. The thermoplastic resin composition of claim 5, wherein the organic nucleating agent comprises poly-D-lactic acid, low-density polyethylene, high-density polyethylene, polypropylene, polyisopropylene, polybutene, poly-4-methylpentene, poly-3-methylbutene-1, polyvinylcycloalkane, polyvinyltrialkylsilane, polybutylene terephthalate, stearic acid amide, ethylene bislauric acid amide, palmitic acid amide, hydroxystearic acid amide, erucic acid amide, tris(t-butylamide) trimesate, hexamethylene-bis-9,10-dihydroxy stearic acid amide, p-xylene-bis-9,10-dihydroxy stearic acid amide, 1,4-cyclohexane dicarboxylic acid dicyclohexylamide, 2,6-naphthalene dicarboxylic acid dianilide, N,N',N''-tricyclohexyl trimesic acid amide, trimesic acid tris(t-butylamide), 1,4-cyclohexane dicarboxylic acid dianilide, 2,6-naphthalene dicarboxylic acid dicyclohexylamide, N,N'-dibenzoyl-1,4-diaminocyclohexane, N,N'-dicyclohexane carbonyl-1,5-diaminonaphthalene, ethylene-bisstearic acid amide, N,N'-ethylene-bis(12-hydroxy stearic acid)amide, decane dicarboxylic acid dibenzoylhydrazide, hexane dicarboxylic acid dibenzoylhydrazide, octane dicarboxylic acid dibenzoylhydrazide, sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, sodium cyclohexane carboxylate, sodium p-toluene sulfonate, sodium sulfoisophthalate, dimethyl-5-sodium sulfoisophthalate, sodium-2,2'-methylenebis (4,6-di-t-butylphenyl)phosphate, aluminum bis(2,2-methylenebis-4,6-di-t-butylphenyl phosphate)hydroxide, benzylidene sorbitol, copper phthalocyanine, zinc phenylphosphonate, or a combination thereof.

8. The thermoplastic resin composition of claim 1, wherein the thermoplastic resin composition comprises about 0.1 wt % to about 10 wt % of the inorganic nucleating agent based on the total weight of the thermoplastic resin composition.

9. The thermoplastic resin composition of claim 1, wherein the resin composition further comprises an unmodified polyglycerol fatty acid ester, a modified polyglycerol fatty acid ester, or a combination thereof.

10. The thermoplastic resin composition of claim 1, wherein the reactive plasticizers comprise epoxidized soybean oil, acrylated soybean oil, maleated soybean oil, acrylated-epoxidized soybean oil, or a combination thereof.

11. The thermoplastic resin composition of claim 1, wherein the thermoplastic resin composition comprises about 3 wt % to about 20 wt % of the reactive plasticizers based on the total weight of the thermoplastic resin composition.

12. The thermoplastic resin composition of claim 1, wherein the thermoplastic resin composition comprises about 82 wt % to about 95 wt % of the polylactic acid, about 2 wt % to about 20 wt % of the thermoplastic polymer, about 0.1 wt % to about 10 wt % of the nucleating agent, and about 2 wt % to about 20 wt % of the reactive plasticizers.

13. The thermoplastic resin composition of claim 1, wherein the thermoplastic resin composition has an Izod impact strength of about 90 J/m or more and a heat distortion temperature (HDT) of about 50° C. or more when molded under molding conditions including a molding temperature of about 50° C. or more and a cooling time of about 150 seconds or less.

14. The thermoplastic resin composition of claim 1, wherein the thermoplastic resin composition has an Izod impact strength of about 100 J/m or more and a heat distortion temperature (HDT) of about 80° C. or more when molded under molding conditions including a molding temperature of about 100° C. and a cooling time of about 150 seconds or less.

15. The thermoplastic resin composition of claim 1, wherein the thermoplastic resin composition has an Izod impact strength when molded under molding conditions including a molding temperature of about 100° C. and a cooling time of about 60 seconds that is about 65% or more of the Izod impact strength of the same thermoplastic resin composition molded under molding conditions including a molding temperature of about 100° C. and a cooling time of about 600 seconds.

16. The thermoplastic composition of claim 1, wherein the thermoplastic resin composition comprises about 85% or more of the polylactic acid based on the total weight of the thermoplastic resin composition.

17. A molded article comprising the thermoplastic resin composition of claim 1.

\* \* \* \* \*